(12) United States Patent
Henriques (10) Patent No.: US 7,602,809 B2
(45) Date of Patent: Oct. 13, 2009

(54) REDUCING TRANSMISSION TIME FOR DATA PACKETS CONTROLLED BY A LINK LAYER PROTOCOL COMPRISING A FRAGMENTING/DEFRAGMENTING CAPABILITY

(75) Inventor: Bengt Henriques, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 891 days.

(21) Appl. No.: 10/508,201

(22) PCT Filed: Mar. 22, 2002

(86) PCT No.: PCT/SE02/00571

§ 371 (c)(1), (2), (4) Date: Sep. 20, 2004

(87) PCT Pub. No.: WO03/081855

PCT Pub. Date: Oct. 2, 2003

(65) Prior Publication Data

US 2005/0152355 A1   Jul. 14, 2005

(51) Int. Cl.
*H04L 12/56* (2006.01)
(52) U.S. Cl. ............................... 370/471; 370/474
(58) Field of Classification Search ................ 370/401, 370/389, 392, 464, 474, 229, 351, 400, 471; 709/238
See application file for complete search history.

(56) References Cited

U.S. PATENT DOCUMENTS

| | | | | |
|---|---|---|---|---|
| 4,958,341 | A * | 9/1990 | Hemmady et al. | 370/352 |
| 4,977,582 | A * | 12/1990 | Nichols et al. | 375/371 |
| 5,440,545 | A * | 8/1995 | Buchholz et al. | 370/426 |
| 5,497,371 | A * | 3/1996 | Ellis et al. | 370/412 |
| 6,073,176 | A * | 6/2000 | Baindur et al. | 709/227 |
| 6,130,880 | A * | 10/2000 | Naudus et al. | 370/235 |
| 6,535,486 | B1 * | 3/2003 | Naudus et al. | 370/235 |
| 6,577,596 | B1 * | 6/2003 | Olsson et al. | 370/230 |
| 6,671,758 | B1 * | 12/2003 | Cam et al. | 710/100 |
| 6,714,985 | B1 * | 3/2004 | Malagrino et al. | 709/236 |
| 6,724,747 | B1 * | 4/2004 | Arango et al. | 370/352 |
| 6,744,927 | B1 * | 6/2004 | Kato | 382/239 |
| 6,795,435 | B1 * | 9/2004 | Jouppi et al. | 370/394 |
| 6,876,669 | B2 * | 4/2005 | Shalom | 370/468 |
| 6,891,855 | B2 * | 5/2005 | Bruckman | 370/468 |
| 6,944,672 | B2 * | 9/2005 | Crow et al. | 709/236 |
| 7,089,486 | B1 * | 8/2006 | Marleux et al. | 714/807 |

(Continued)

FOREIGN PATENT DOCUMENTS

WO   WO 0228048   4/2002

(Continued)

OTHER PUBLICATIONS

C. Bormann "The Multi-Class Extension to Multi-Link PPP" RFC 2686 IETF, section 2-6.

*Primary Examiner*—Melvin Marcelo (57) ABSTRACT

A system, method, and router in a packet-switched communication network for enhancing network performance when data packets are transported utilizing a link layer protocol such as the Point-to-Point Protocol (PPP). Lengthy low priority data packets are fragmented at each hop. A router receiving the fragments of the data packets routes the fragments to a subsequent hop independent of whether other fragments from the same data packets have reached the router. High priority data packets are passed through unfragmented.

11 Claims, 8 Drawing Sheets

U.S. PATENT DOCUMENTS

| | | | |
|---|---|---|---|
| 7,184,402 B1* | 2/2007 | Sharma et al. | 370/232 |
| 7,224,703 B2* | 5/2007 | Antal et al. | 370/473 |
| 7,283,527 B2* | 10/2007 | Brown et al. | 370/392 |
| 7,292,530 B2* | 11/2007 | Christensen | 370/230.1 |
| 7,302,491 B2* | 11/2007 | Brown et al. | 709/236 |
| 7,315,900 B1* | 1/2008 | Ofelt et al. | 709/238 |
| 7,403,999 B2* | 7/2008 | Corl et al. | 709/230 |
| 2002/0010866 A1* | 1/2002 | McCullough et al. | 713/201 |
| 2002/0051466 A1* | 5/2002 | Bruckman | 370/474 |
| 2002/0131425 A1* | 9/2002 | Shalom | 370/401 |
| 2003/0058836 A1* | 3/2003 | Even | 370/352 |
| 2003/0081605 A1* | 5/2003 | Egevang | 370/392 |
| 2003/0110286 A1* | 6/2003 | Antal et al. | 709/236 |
| 2004/0093521 A1* | 5/2004 | Hamadeh et al. | 713/201 |
| 2005/0025185 A1* | 2/2005 | Brown et al. | 370/474 |
| 2005/0129020 A1* | 6/2005 | Doyle et al. | 370/392 |
| 2005/0152355 A1* | 7/2005 | Henriques | 370/389 |
| 2006/0039379 A1* | 2/2006 | Abe et al. | 370/394 |
| 2006/0098684 A1* | 5/2006 | Bozionek et al. | 370/466 |
| 2007/0263542 A1* | 11/2007 | Bammesreiter et al. | 370/235 |

FOREIGN PATENT DOCUMENTS

| | | |
|---|---|---|
| WO | WO 0228048 A2 | 4/2002 |

* cited by examiner

REDUCING TRANSMISSION TIME FOR DATA PACKETS CONTROLLED BY A LINK LAYER PROTOCOL COMPRISING A FRAGMENTING/DEFRAGMENTING CAPABILITY

FIELD OF THE INVENTION

The present invention relates to a packet switched network, preferably an Internet Protocol (IP) network.

In particular, it relates to enhancing performance for data (e.g. IP) packets when a link layer protocol, adapted to fragment said data packets at each hop, is used within the network.

BACKGROUND OF THE INVENTION

The PPP protocol is a link layer protocol developed to provide an auto configuring, multi-protocol mechanism for exchanging variable length packets over serial point-to-point links. One protocol that can be transported over PPP is the IP.

When both real-time critical traffic and low priority traffic are sent in the same IP network over PPP links, it is very important that the real-time critical traffic is not interfered by the low priority traffic in order to fulfil the delay requirements of the real-time critical traffic. This is of course dependent on the link technology that is being used. However, the present invention concerns preferably PPP links. Even if the delay requirements of the real-time critical traffic are important to fulfil, the lower priority traffic may also have delay requirements. Therefore, this lower priority traffic must also be considered.

If the low priority IP packets are long, the transmission of such packets may block the link for a long period of time. (The length of an IP packet may differ from e.g. 40 bytes to 1500 bytes.) This is solved by fragmentation of the IP packets at PPP level by using the PPP Multilink Protocol (MP), which is further described in K. Sklower et. al., "The PPP Multilink Protocol (MP)", RFC 1990. Originally, the MP was a protocol that facilitated the use of several physical links as one logic link. One part of the standard also defines a method for splitting and recombining packets.

The fragmentation creates shorter packets, which decreases the blocking time for the real-time critical traffic (high priority traffic). The use of MP introduces extra queues at the link layer besides the original PPP queue. More than one queue at the link layer for a certain router introduces a need for a scheduler at the link layer as showed in FIG. 7a.

Figure 1:
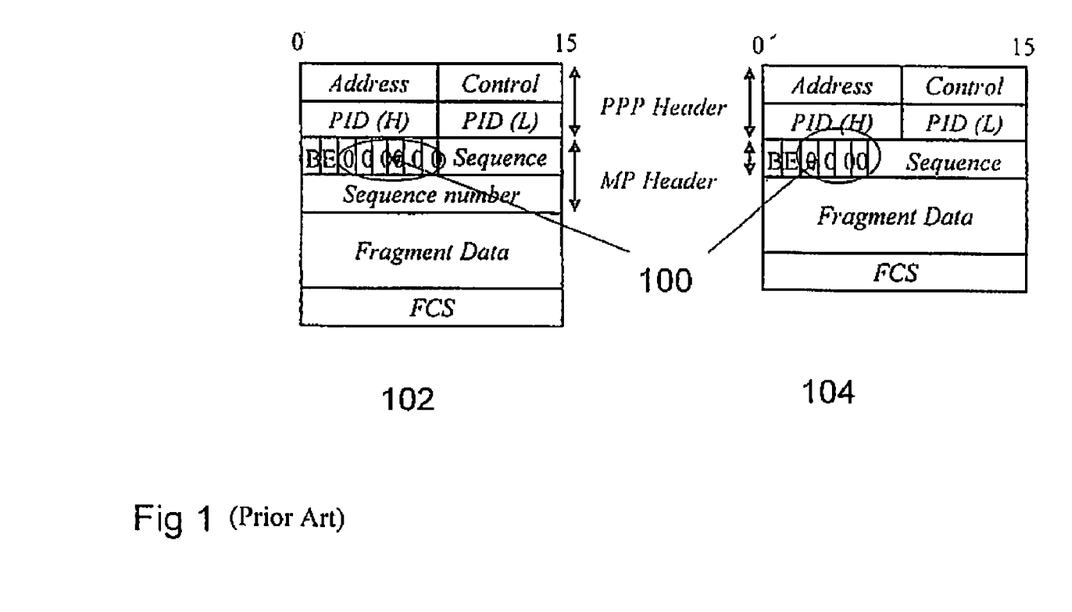
FIG. 1 illustrates MP header formats.

Each MP fragment comprises a PPP header, an MP header and a payload portion. There are two versions of the MP header; a long header and a short header. The long header has a size of four bytes and the short header has a size of two bytes. Which of the two headers that is used depends on the maximum number of MP fragments that is needed ($2^{10}$ or $2^{24}$) for a fragmentation of one IP packet, since the difference between the two headers is the number of bits that indicates a sequence number. The sequence number indicates the order of the MP fragments of an IP packet. If a B-bit (Beginning) is marked in an MP fragment, it indicates that this is the beginning of the IP packet and if an E-bit (End) is marked, that indicates accordingly that the fragment is the end of the IP packet. The header keeps track on in what order the fragments should be reassembled by using a sequence number, which also results in that no re-ordering occurs between the reassembled IP packets. FIG. 1 shows the Multilink PPP (MP) header formats. The long header is shown in 102 and the short header is shown in 104. It should be noted that some bits in FIG. 1 are used for MP Multi-Class Extension which is further described below. (When Multi-Class Extension (MCE) is not used, the MCE bits are spare bits.)

Figure 7A:
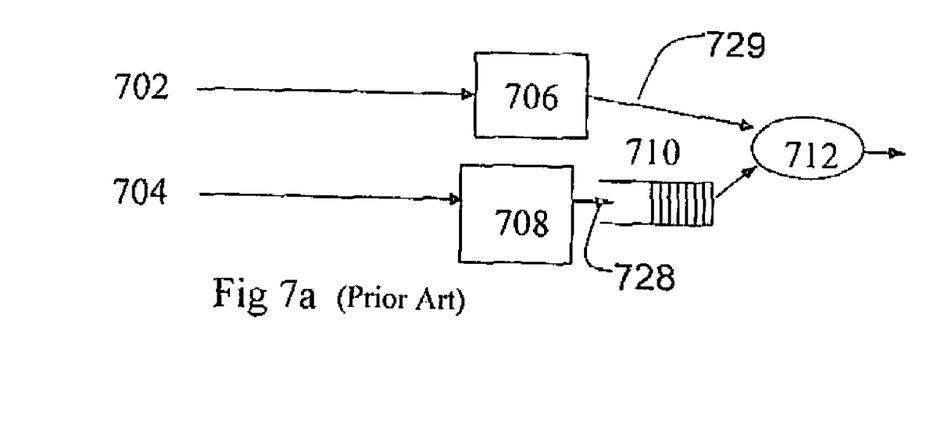
FIG. 7a shows an egress interface without pipelining.
Figure 7B:
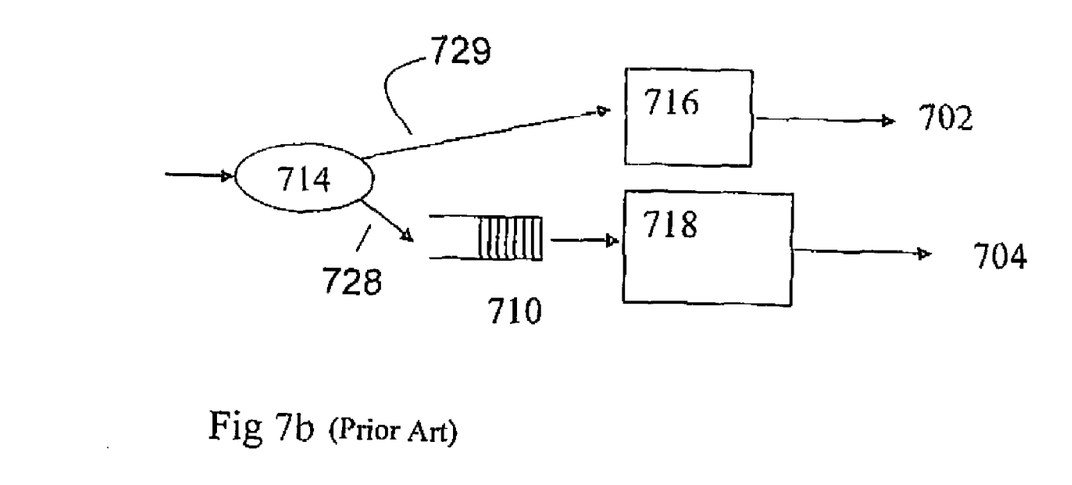
FIG. 7b shows an ingress interface without pipelining.
Figure 7C:
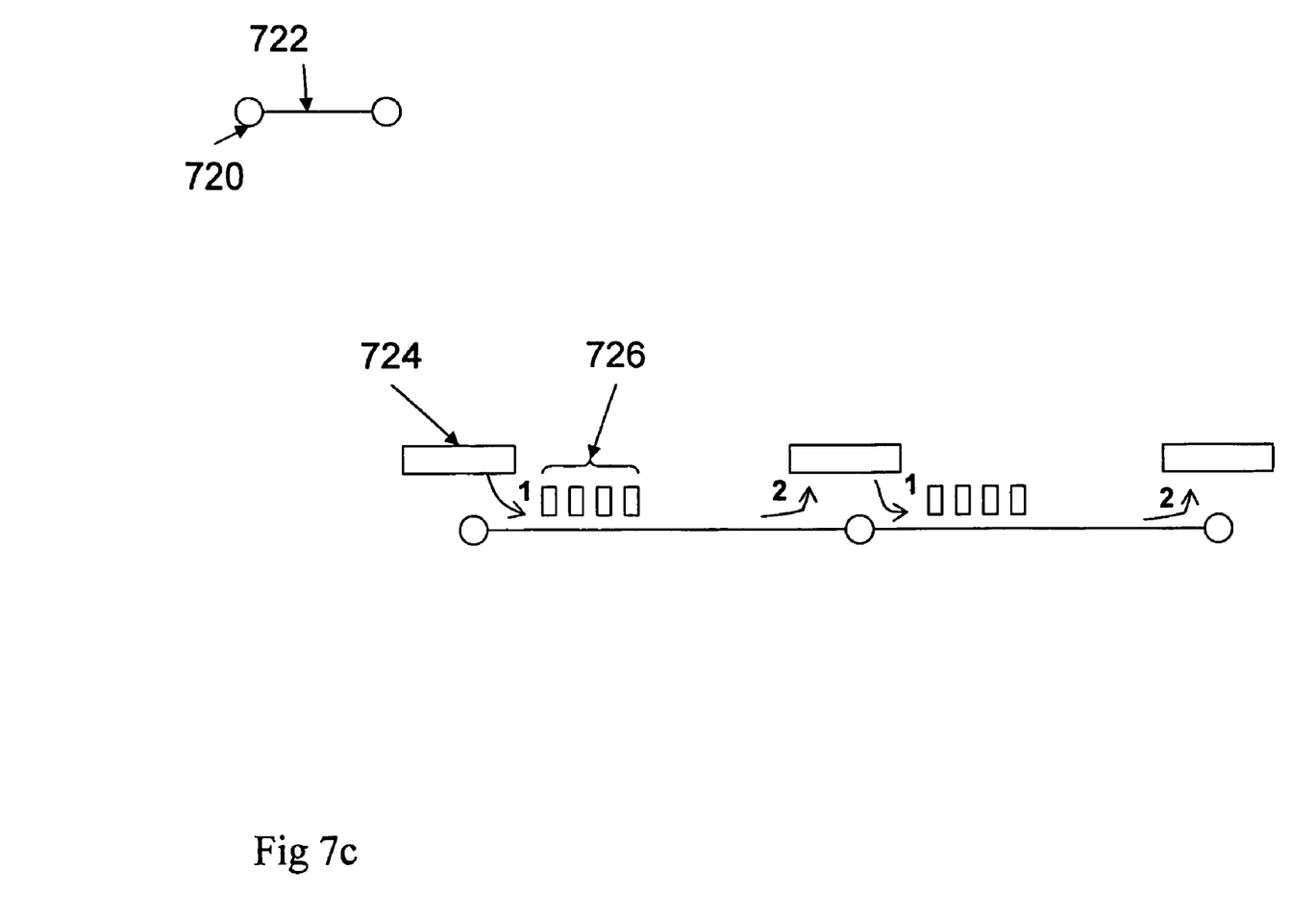
FIG. 7c shows fragmentation and reassembling of IP packets at each hop

When using MP for fragmentation, the fragmentation is performed per PPP link and the fragments must be reassembled to an IP packet at the end of every link as shown in FIG. 7c. FIG. 7c shows a number of routers 720 connected via PPP links 722, that may be one physical link or a bundle of PPP links, where each IP packet 724 is fragmented (1) into MP MCE fragments 726 and defragmented (2) into IP packets at each router 720. If MP fragmentation is performed for several hops in a row, the IP packets are fragmented and reassembled (i.e. defragmented) at every hop provided that fragmentation is used. Since the fragments have lower priority than real-time critical packets (e.g. voice), they are probably not sent "back-to-back", (back-to-back means that the fragments are sent immediately after each other). It is more time consuming to send an MP fragmented IP packet than an unfragmented IP packet due to the extra overhead, but the major part of the extra delay is due to the waiting time introduced when other fragments/frames (of higher priority) are sent between the MP fragments. Over one single link hop (it does not have to be a single physical link, it could also be a bundle of physical links as well), hereinafter referred to as the one hop case, the delay can not be affected but if MP fragmentation is used over several serial PPP links in a row, the delay is decreased by sending the MP fragments to the end router where MP fragmentation is used without reassembling the MP fragments to IP packets at each intermediate router. In the present invention, this is called MP pipelining. The invention concerns the situation where at least two subsequent PPP links are using MP fragmentation.

When MP fragments from several IP packets are transported in parallel, as in the present invention, it is impossible to reassemble them correctly if it is not possible to differentiate the MP fragments by employing different classes. This may be done by the MP Multi-Class Extension (MCE) protocol. The MCE allows a sender to fragment the packets of various priorities into multiple classes of fragments, and thereby allowing high-priority packets to be sent between fragments of lower priorities, as well as fragments belonging to different IP packets of same priority are allowed to exist mixed on a single link. MP multi-class extension bits 100 are located in the MP header as shown in FIG. 1. Otherwise, these bits are unused if MCE is not employed. An MP fragment may comprise a long header or a short header. The long header uses 4 bits for multi-class extension and in the short header 2 bits are used. The multi-class extension to MP is further described in RFC 2686 that is further defined below.

In MP pipelining, the long low-priority IP packets are fragmented and MP MCE framed, and in the present invention they are referred to as MP MCE fragments. The high-priority IP packets may only be PPP framed, but if the PPP link is a bundle (several physical links), reordering might occur between the PPP packets. An alternative is thus to also MP MCE frame these packets, in addition to the PPP frame. However, these packets are only framed, not fragmented. In the present invention they are referred to as PPP frames but it should be noted that MP MCE may also be used and they may hence also be MP MCE frames.

Furthermore, FIG. 7a illustrates an egress interface without MP pipelining where MP MCE is used but it may also be the first interface in a pipeline. The respective IP classes (i.e. high 702 and low priority 704) are associated with an MP MCE class. The high priority IP packets are sent into an MP MCE/PPP framing unit and further to a scheduler 712. The low priority IP packets are sent into an MP MCE fragmenting and framer unit 708, where MP MCE fragments are created and the fragments are then sent into an MP MCE buffer 710. The scheduler 712 schedules the MP MCE fragments 728 in between the PPP frames 729 comprising the high priority data packets. FIG. 7b illustrates thus an ingress interface without pipelining where MP MCE is used. The PPP frames 729 and the MP MCE fragments 728 are demultiplexed in a demultiplexer 714 and the PPP frames 729 are further sent to a MP MCE/PPP deframer unit 716 while the MP MCE fragments are sent into a buffer 710 and then to a subsequent MP MCE defragmenting/deframer unit 718. This results in two separate queues of high priority and low priority data packets. Thus, these deframing and defragmenting procedures are performed subsequently to every hop.

U.S. Pat. No. 5,497,371 describes a packet transport system for mixed traffic in which a packet fragmentation protocol allows traffic of different classes to occupy a single physical link. Low priority packets are fragmentated while high priority packets are never fragmentated. In order to avoid potential fragment mis-ordering, packets are only allowed to be fragmentated on a trunk or a link, where the link acts like a first-in first-out buffer.

U.S. Pat. No. 6,072,772 shows a crossbar switch where fragmentation of packets with variable size into packets with a fixed size provides guarantees for deterministic bandwidth and delay.

U.S. Pat. No. 6,148,000 shows a switching apparatus for receiving and transmitting data units each segmented into a series of cells of data. The apparatus comprising a storage device for storing the series of cells received at each incoming port until the last cell of said series is received.

K. Sklower et. Al., "The PPP Multilink Protocol (MP)", RFC 1900 proposes a method for splitting, recombining, and sequencing datagrams across multiple logical data links.

C. Bormann, "The Multi-Class Extension to Multi-Link PPP", RFC 2686 proposes a fragment-oriented solution for the real-time encapsulation format part of the architecture. This document is regarded as the closest prior art.

Thus, the objective problem of the present invention is to enhance performance for data packets when a link layer protocol adapted to fragment said data packets, e.g. the MP is used within a packet switched network.

SUMMARY OF THE INVENTION

An advantage with the present invention is that the transmission time for a long low-priority data packet is decreased by pipelining the fragments of the data packet when a link layer fragmentation is used over several links after each other. The fragments are not reassembled into data packets at every intermediate router but instead directly sent to e.g. the last router in the pipeline where they are reassembled. This is achieved by dividing the IP packets into fragments having a size such that an entire IP header fits into one fragment, whereby the identity of the IP packet that the fragment belongs to is revealed.

Another advantage with the present invention is that the transmitting time is not just minimized for the high priority data packets but the delay qualities for the low priority data packets is also taken into consideration.

Yet another advantage with present invention is that MP MCE fragments belonging to several IP packets are able to coexist on common links provided that that the MP multiclass extension protocol is used.

DETAILED DESCRIPTION OF PREFERRED EMBODIMENTS

Figure 2:
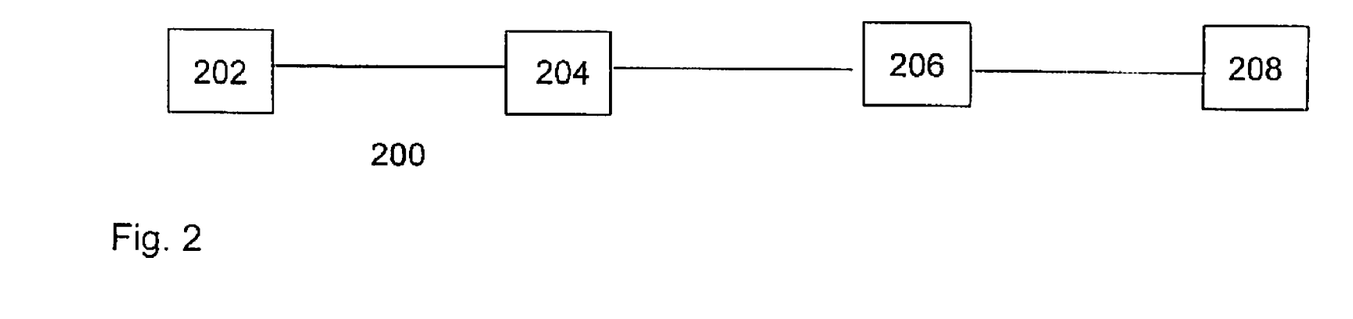
FIG. 2 shows an exemplary system in which the present invention may be implemented.

Preferred embodiments of the present invention will now be described with references in particular to FIGS. 3 to 6 and 8-10. FIG. 2 illustrates an exemplary communication system in which the present invention may be implemented. High and low priority data packets are sent from a first router 202 to a second router 208 via two intermediate routers. The routers are adapted to route data packets.

The solution to the objective problem according to the present invention is achieved by sending a fragment belonging to a first data packet, preferably with low priority, from a first intermediate router to a second intermediate router independent of if other fragments of the first IP packet have arrived to the first intermediate router. That is provided that the fragment comprising the header portion of the data packet is arriving to the second router before the other fragments belonging to the same data packet. This process is called pipelining. The transmission delay of low priority data packets is thereby minimized.

The present invention is exemplified herein by employing MP with MCE in an IP network. However it is possible to employ another link layer protocol with a per-hop fragmenting capability (e.g. ATM or Frame Relay), wherein a data packet is fragmented into fragments framed with a header portion comprising an identification of said data packet.

The MP MCE may indicate the priority of the packets as described above. According to the present invention, it can also be used for indicating from which router the fragments origin in order to reassemble the MP fragments into IP packets correctly. E.g., half of the classes may be used for priority purposes and the other half may be used to indicate from which router a packet origin, or all classes may be used for origin indication. All MP MCE fragments belonging to the same IP packet are required to belong to the same class and preferably, all fragments from a certain MP MCE queue shall belong to the same class. During defragmenting, the fragments are sorted into the correct queue according to their multi-class.

Figure 3:
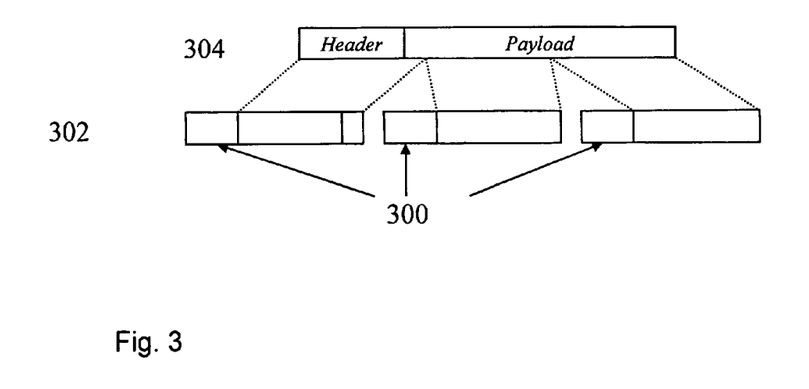
FIG. 3 illustrates how an IP packet is fragmented according to the present invention.

The fragmentation is shown in FIG. 3. A PPP framed IP packet (i.e. the IP packet is PPP framed with a compressed PPP header before it is MP and PPP framed again) 304 is MP MCE fragmented at a fragmenting unit and PPP and MP MCE headers are added at a framing unit before it is sent into the MP MCE queue (e.g. in a buffer). An MP MCE fragment 302 comprises a low-level header 300 and a payload with the fragmented IP packet. The low-level header 300 comprises an MP MCE header in addition to the PPP header. The size of the fragments must have a size such that the header portion of the data packet, i.e. an entire IP header and a compressed PPP header fits into one fragment. An IPv6-header consists of 40 bytes and an IPv4-header consists of 20 bytes, however that is no limitation to the present invention. The size of a compressed PPP header is 2 bytes. In a first embodiment, the first arriving fragment at an intermediate router must comprise the IP header. In a second embodiment according to the present invention, fragments only comprising a part of the payload of the IP packet may be stored until the fragment comprising the header arrives or the fragments comprising the payload is stored a predetermined time period and then discarded if the "header-fragment" has not arrived. The MP MCE fragment comprising the header is hence the fragment comprising the beginning of the IP packet (this fragment is identified by the marked B-bit, e.g. the B-bit has the value 1) and it is required for the routing of the MP MCE fragments. At the router, it is sent to the IP look-up stage (where routing is performed) where an output port is decided in order to route the fragment to a subsequent intermediate router according to the IP destination address indicated in the header portion. An entry in a layer 2 (L2) forwarding table is created where the value of the MCE class is connected to the output port. The multi-class extension indicates from where the fragment origins. When a fragment arrives without a marked B-bit, i.e. the fragment comprises a payload (information) portion of the IP packet, the multi-class extension number located in the MP header is mapped onto the table, the output port is revealed and the fragment is then sent to the determined port. This can be implemented by e.g. tagging of packets with the port number and other necessary information, i.e. the identity of a packet is stored with links to e.g. the port number.

Figure 4:
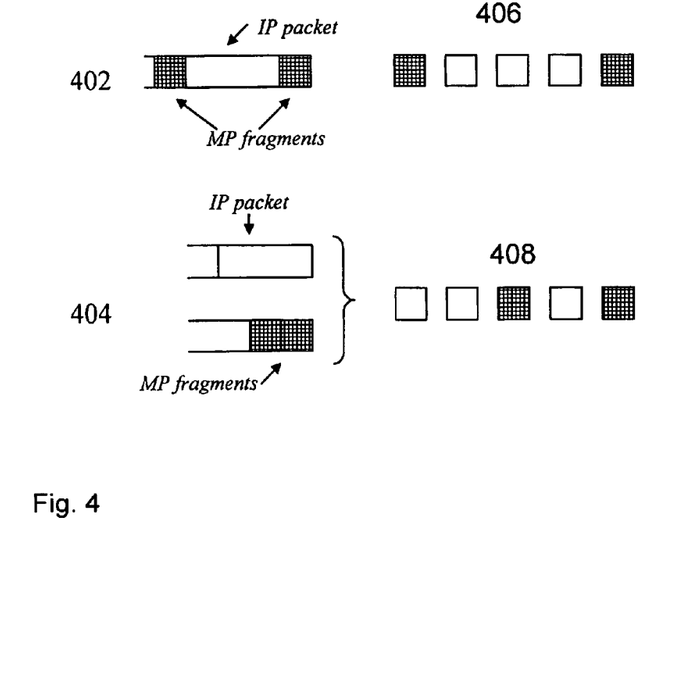
FIG. 4 illustrates queues for IP packets and MP fragments according to the present invention.

MP MCE fragments in the MP MCE buffer on the egress side of an intermediate router may either have arrived to the router as MP MCE fragments sent from a previous router, referred to as arrived MP MCE fragments, or as IP packets which were MP MCE fragmented at the egress side of the router, referred to as locally generated MP MCE fragments. When an IP packet is MP MCE fragmented, each MP MCE fragment is stored in the MP MCE buffer one after each other. When the same MP MCE buffer is used for locally generated MP MCE fragments and arriving MP MCE fragments, arriving MP MCE fragments can not be stored in between the locally generated MP fragments. In the worst case, an arriving MP MCE fragment belonging to a first IP packet have to wait for all the MP MCE fragments belonging to said first IP packet. This waiting procedure consumes some of the delay-profit obtained by the use of MP pipelining. This is illustrated in FIG. 4, where the MP MCE fragments fragmented in a previous router are stored in a common queue 402 as an IP packet that is fragmented locally. It is further shown how the MP MCE fragments are transmitted on the link 406.

That is solved according to the present invention by having several MP MCE queues 404, one for locally generated MP MCE fragments and one or more for arriving MP fragments fragmented in a previous router as in FIG. 4. To achieve fairness, these queues must be managed in a fair manner by a scheduling entity. It is shown how the MP MCE fragments are transmitted on the link 408.

Figure 5:
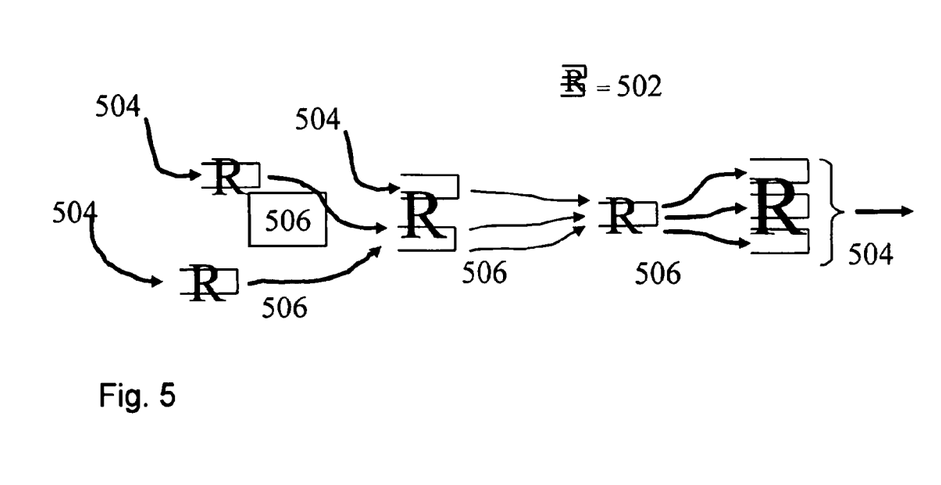
FIG. 5 shows the uplink IP packet and MP fragment stream according to the present invention.

At the end of the last link, in the direction of the aggregation, i.e. the uplink direction where MP MCE fragmentation is used, each MP MCE class is required to have its own reassemble queue. Basically, this means that every MP MCE queue further down in the network must have one corresponding reassembling queue in end of the link. As shown in FIG. 5, IP packets 504 are MP MCE fragmented at the egress side of the router (not shown in the figure). Each router 502 comprises two queues. Arriving MP MCE fragments 506 and locally generated MP MCE fragments 506 are sent into different egress link level queues. In the end router 502 of the MP pipeline, the MP MCE fragments 506 are reassembled into IP packets 504. That is done at the ingress side of the router 502. Each queue where IP packets 504 are fragmented into MP MCE fragments 506 must have a corresponding queue at the router where the reassembling is performed.

Figure 6:
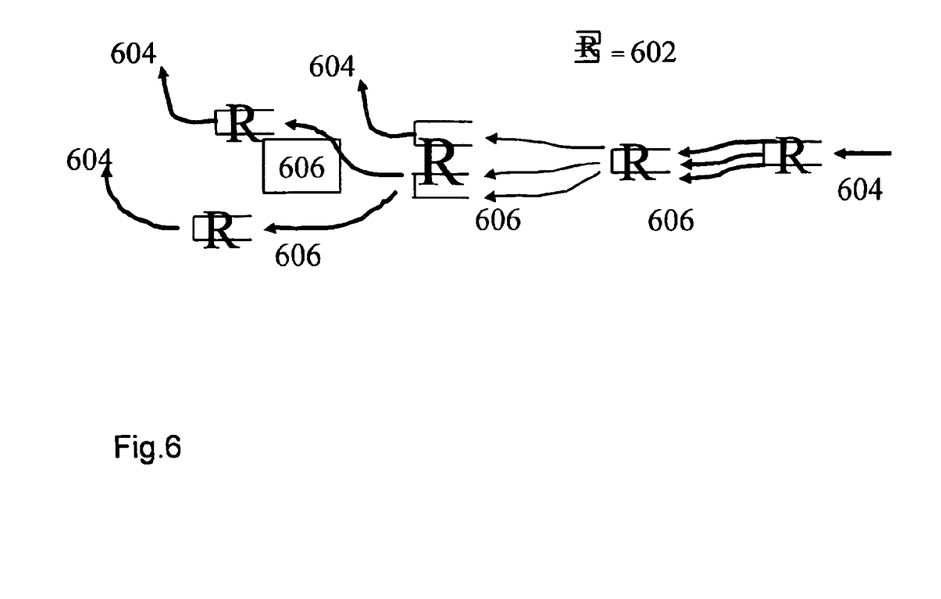
FIG. 6 shows the downlink IP packet and MP fragment stream according to the present invention.

In the opposite direction, i.e. the downlink direction, it is enough with one queue per priority level at the starting point of the pipeline. The MP fragments 606 must there be classified, by using the MP multi-class extension bits 100, in order to ensure that the fragments 606 belonging to the same IP packet are filtered and reassembled at the correct router 602. As shown in FIG. 6, in the downlink direction, only one queue per priority class (i.e. MP multi-class extension) is enough at the beginning of the pipeline. The IP packets 604 are fragmented into MP MCE fragments 606, and they are classified, by using the MP multi-class extension (MCE), depending on at which router they will be filtered and reassembled. The MCE indicates from which router the fragment origins and identifies thereby the IP packet from which they are fragmented. The IP packets 604 are fragmented into MP MCE fragments 606 at the egress side of the router 602 and MP MCE fragments 606 are reassembled into IP packets 604 at the ingress side of the router 602.

The reassembling (i.e. defragmentation) is performed similar to the one hop case and similar to how the packets with lost MP MCE fragments should be treated. If the MP MCE fragment comprising the header portion is lost, the remaining fragments belonging to the same IP packet may be discarded in one of the subsequent routers, i.e. if there is no index corresponding to the MP multi-class extension of the MP MCE fragment. A solution is to store MP MCE fragments which do not have a corresponding entry in the L2 forwarding table until the MP MCE fragment comprising the header portion arrives, or until a predetermined time period has passed or until the end MP MCE fragment shows up and then discard all the other MP MCE fragments belonging to the same IP packet. If the MP MCE fragments are sent to the end of the pipeline, the fragments will there be discarded as they would have been done for the one hop case (if an intermediate or the last fragment is lost).

If an MP MCE fragment, comprising a marked E-bit, arrives, the entry in the L2 forwarding table may be discarded when the fragment is sent. This should only be performed if all the fragments are transmitted in order. That may be ensured by checking the sequence number in the MP header.

The above mentioned methods are only examples how this fault handling may be managed. Naturally, other solutions are also possible.

Figure 8A:
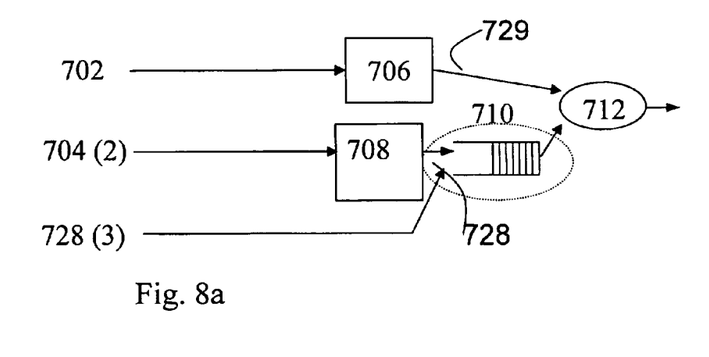
FIG. 8a shows an egress interface with pipelining according to the present invention.

In a preferred embodiment according to the present invention shown in FIG. 8a, an egress interface with MP pipelining is disclosed where all the MP MCE fragments share the same egress buffer 710. The low priority IP packets 704(2), that are fragmented and MP MCE framed are classified with different classes (extended multi-class) in order to be able to correct reassemble the MP MCE fragments into IP packets at the end node in FIG. 8c. A high priority IP packet 702 is sent into a first queue into a MP MCE/PPP framing unit 706 in FIG. 8a, a first low priority IP packet 704(2) is sent into a second queue into a MP MCE fragmenting/framing unit 708, MP MCE fragments 704(3) belonging to a second IP packet, preferably of low priority, are sent into the same buffer 710 as the MP MCE fragments belonging to the first low priority IP packet. In the buffer 710, the arriving MP MCE fragments 704(3) are not queued in between the MP MCE fragments belonging to an IP packet from (2). A scheduler schedules 712 the MP MCE fragments 704 (2,3) in between the high priority MP MCE/PPP framed IP packets 729.

Figure 8B:
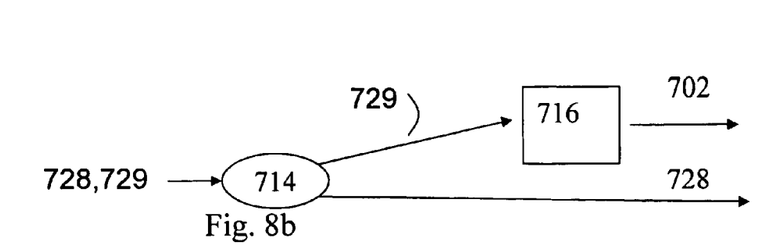
FIG. 8b shows an ingress interface of an intermediate node with pipelining according to the present invention.

FIG. 8b shows the ingress interface of an intermediate router with pipelining in accordance with the present invention. MP MCE/PPP frames 729 and MP MCE fragments 728 are demultiplexed by a demultiplexer 714 into separated flows. The MP MCE/PPP frames are MP/MCE or PPP deframed by a deframer 716 located in the intermediate router. The MP MCE fragments 728 are transferred further to a subsequent router according to their MCE that is associated with an output port number of the intermediate router. The MP MCE fragments 728 are thus either deframed or defragmented.

Figure 8C:
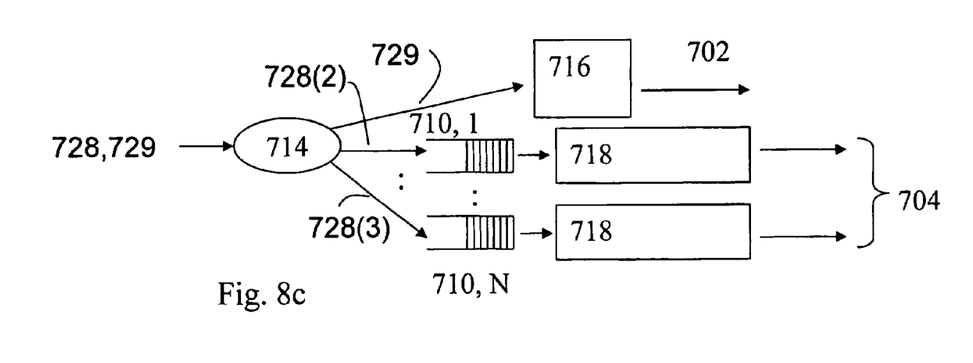
FIG. 8c shows an ingress interface of the end node in the pipeline according to the present invention.

FIG. 8c shows an ingress interface of an end node in the pipeline. MP MCE/PPP frames 729 and MP MCE fragments 728 are demultiplexed by a demultiplexer 714 into separated flows according to the multi-class, i.e. the MP MCE/PPP frames 729, MP MCE fragments 728(2) belonging to the first IP packet and MP MCE fragments 728(3) belonging to the second IP packet. The MP MCE/PPP frames are sent to a MP MCE/PPP deframing unit 716 and the respective flow of MP MCE fragments is sent to a respective buffer 710 prior to the respective MP MCE defragmenting/deframing unit 718. This procedure results in a flow of IP packets 702,704, comprising a header portion and a payload portion.

Figure 9A:
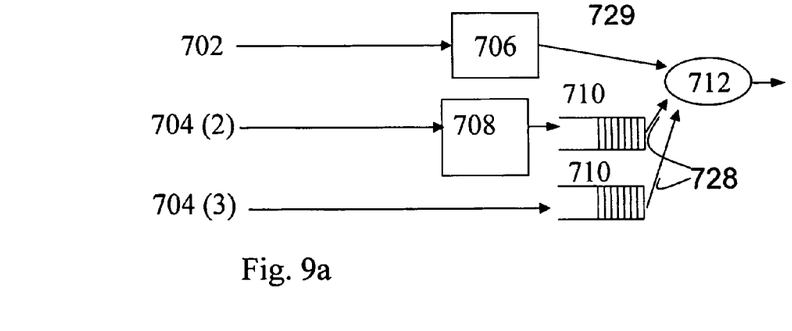
FIG. 9a shows an egress interface with pipelining with a separate buffer for arriving MP fragments according to the present invention.

In a second preferred embodiment according to the present invention shown in FIG. 9a, an egress interface with pipelining comprising a separate buffer for the arriving MP MCE fragments. The IP packets are fragmented and MP MCE framed and associated to different multi-classes in order to be able to correct reassemble the MP MCE fragments into IP packets at the end node in FIG. 9c. A high priority IP packet 702 is sent into a first queue into a MP MCE/PPP framing unit 706 in FIG. 9a, a first low priority IP packet 704 (2) is sent into a second queue into an MP MCE fragmenting/framing unit 708 and then into a first buffer 710, MP MCE fragments (3) belonging to a second IP packet, preferably of low priority, are sent into a separate second buffer. A scheduler 712 schedules the MP MCE fragments from the first and second buffer 710 in between the high priority MP MCE/PPP frames 729.

Figure 9B:
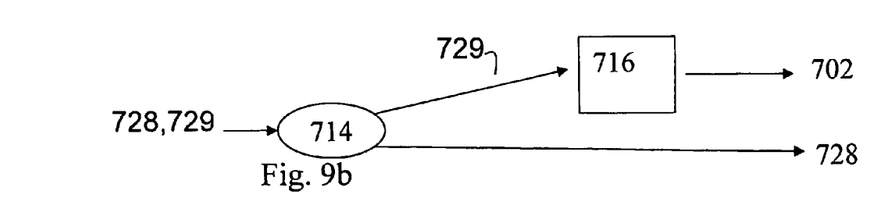
FIG. 9b shows an ingress interface of an intermediate node with pipelining according to the present invention.
Figure 9C:
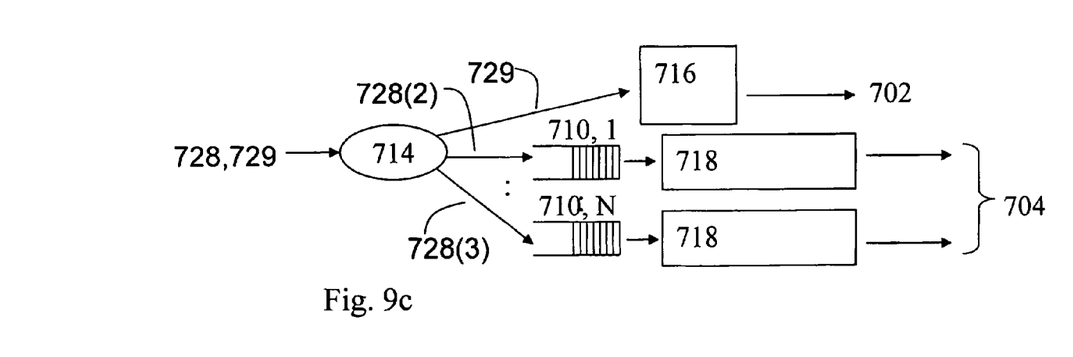
FIG. 9c shows an ingress interface of the end node in the pipeline according to the present invention.

FIG. 9b shows the ingress interface of an intermediate router with pipelining in accordance with the present invention. MP MCE/PPP frames 729 and MP MCE fragments 728 are demultiplexed by a demultiplexer 714 into separated flows. The MP MCE/PPP frames 729 are MP MCE/PPP deframed by a deframer 716 located in the intermediate router. The MP MCE fragments 728 are further transferred to a subsequent node according to their MCE that is associated with an output port number of the router. The MP MCE fragments 728 are thus not deframed or defragmented. FIG. 9c shows an ingress interface of an end node in the pipeline. The procedure is identical to the procedure of FIG. 8c.

Referring to FIGS. 7a-9c, all functionality such as fragmenting/defragmenting, framing/deframing, demultiplexing and scheduling may be located within a router and implemented by means of hardware or software.

Figure 10:
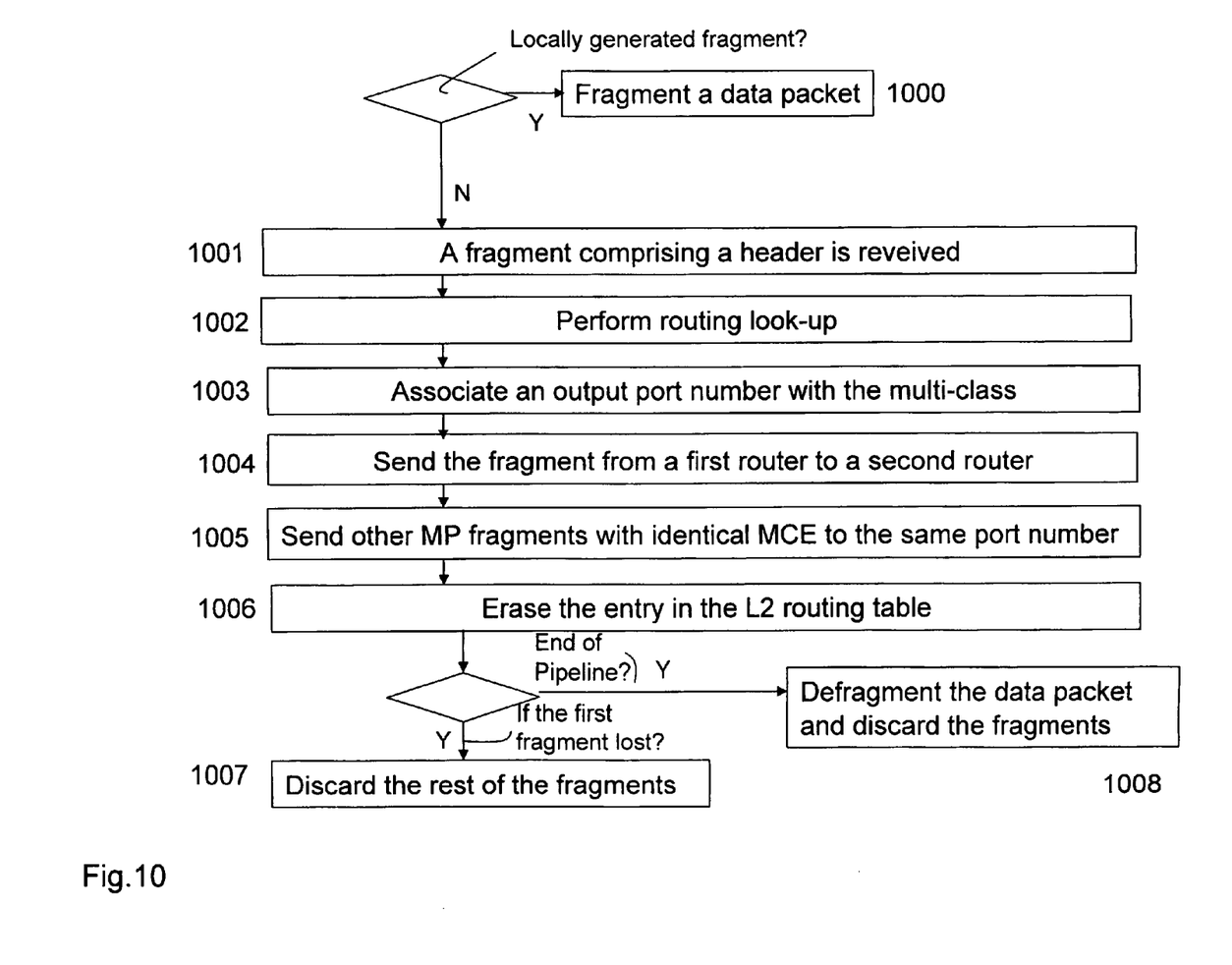
FIG. 10 shows a flowchart of the method according to the present invention.

The method is implemented in a router according to the present invention and is further described by FIG. 10 and the example below.

Locally Generated MP MCE Fragments at the Router:

1000: A first low priority IP packet is fragmented into a plurality of MP MCE fragments at a first router, wherein the first MP MCE fragment includes the header portion of the IP packet. The fragments are forwarded after the fragmentation to a subsequent intermediate router.

Arriving MP MCE Fragments at the Router, Previous Fragmented at Another Router:

1001: A first MP MCE fragment belonging to a second IP packet comprising the header portion of a second IP packet is received at the router, wherein the fragment has a marked B-bit.

1002: Perform routing look-up, i.e. determine an output port number at the router in order to route the first MP MCE fragment to a subsequent router. (Each output port of the router is associated with a subsequent router.) It is important that the MP MCE fragment comprising the header portion is arriving to the router first relative to the other fragments belonging to the same IP packet.

If one of the other fragments belonging to the same IP packet arrives first has an unmarked B-bit, implying that the fragments of the IP packets have not arrived in the correct order, different methods may be used. One alternative is to discard all fragments with the same multi-class extension as the arrived fragment until a fragment is received comprising a marked E-bit. A second alternative is to store the arrived fragment in e.g. a buffer a predetermined time or until a fragment with a marked E-bit arrives or based upon another parameter.

1003: Associate an output port number with the MP multi-class extension of the first MP fragment comprising the header portion of the second IP packet in an L2 routing table. The IP packet the fragment belongs to is identified by the multi-class extension.

1004: Send the first MP fragment from the router to a subsequent router independent of if other MP fragments, belonging to the same second IP packet, have arrived to the first router.

1005: Send other MP fragments with the identical multi-class, as the first MP fragment, to the port number stored in the L2 table at the router.

1006: Erase the entry in the L2 routing table when a fragment with a marked E-bit has been sent, if it is guaranteed that all fragments are sent in order, which implies that the rest of the fragments belonging to the same IP packet already have been sent.

1007: Discard the rest of the fragments, if the first fragment is lost, i.e. if there is no index corresponding to the multi-class of the MP fragment.

Repeat steps 1001b-1008 until the end of the pipeline is reached and the MP MCE fragments having identical multi-class extension are reassembled.

1008: Discard the MP fragments provided that they are sent to the end of the pipeline and the IP packet is reassembled.

The method may be implemented by means of a computer program product comprising the software code means for performing the steps of the method. The computer program product is run on processing means in a router in an IP network.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a packet switched network for reducing transmission time for data packets sent from a transmitting router to a receiving router through at least one intermediate router, wherein the data packets are of different lengths and different priorities, the method comprising the steps of:
   determining by the transmitting router that a first data packet is a lengthy low priority data packet;
   fragmenting the first data packet at the transmitting router into a plurality of fragments while keeping other data packets unfragmented, each of the fragments including an identifier of the first data packet;
   transmitting the unfragmented data packets and the fragments of the first data packet toward the receiving router;
   at each intermediate router, forwarding each received unfragmented data packet and each received fragment of the first data packet toward the receiving router, wherein the fragments are forwarded without regard to the order of fragments or whether all fragments belonging to the first data packet have reached the intermediate router; and
   defragmenting the fragments into the first data packet at the receiving router.

2. The method according to claim 1, wherein the packet switched network is an Internet Protocol (IP) network, the first data packet is a lengthy low priority IP packet fragmented into Multilink Point to Point Protocol (PPP) (MP) Multi-Class Extension (MCE) fragments, the first data packet is identified by using the multi-class extension, and a header portion of the first data packet includes at least an IP header and a compressed PPP header.

3. The method according to claim 1, wherein the fragmenting step includes placing in a first fragment to be transmitted, a header portion of the first data packet, said header portion including a destination address of the receiving router.

4. The method according to claim 3, wherein the forwarding step at each intermediate router includes:
   associating the identifier of the first data packet with an output port number of the intermediate router in accordance with the destination address indicated in the header portion of the first fragment; and
   transmitting all received fragments having the same identifier through the same output port in the order in which they were received.

5. A system in a packet switched network for reducing transmission time for data packets sent from a transmitting router to a receiving router through at least one intermediate router, wherein the data packets are of different lengths and different priorities, the system comprising:
   means within the transmitting router for determining that a first data packet is a lengthy low priority data packet;
   means within the transmitting router for fragmenting the first data packet into a plurality of fragments while keeping other data packets unfragmented, each of the fragments including an identifier of the first data packet;
   means within the transmitting router for transmitting the unfragmented data packets and the fragments of the first data packet toward the receiving router;
   means within each intermediate router for forwarding each received unfragmented data packet and each received fragment of the first data packet toward the receiving router, wherein the fragments are forwarded without regard to the order of fragments or whether all fragments belonging to the first data packet have reached the intermediate router; and
   means within the receiving router for defragmenting the fragments into the first data packet.

6. The system according to claim 5, wherein the packet switched network is an Internet Protocol (IP) network, the first data packet is a lengthy low priority IP packet fragmented into Multilink Point to Point Protocol (PPP) (MP) Multi-Class Extension (MCE) fragments, the first data packet is identified by using the multi-class extension, and the header portion of the first data packet includes at least an IP header and a compressed PPP header.

7. The system according to claim 5, wherein the means for fragmenting includes means for placing in a first fragment to be transmitted, a header portion of the first data packet, said header portion including a destination address of the receiving router.

8. The system according to claim 7, wherein the forwarding means within each intermediate router includes:
   means for associating the identifier of the first data packet with an output port number of the intermediate router in accordance with the destination address indicated in the header portion of the first fragment; and
   means for transmitting all received fragments having the same identifier through the same output port in the order in which they were received.

9. An intermediate router in a packet switched network, comprising:
   means for receiving a plurality of fragments of a first data packet and a plurality of other unfragmented data packets, wherein each of the fragments includes an identifier of the first data packet;
   means for forwarding each received unfragmented data packet to a destination identified in a header of the unfragmented data packet; and
   means for forwarding each received fragment of the first data packet toward a receiving router, wherein the fragments are forwarded without regard to the order of fragments or whether all fragments belonging to the first data packet have reached the intermediate router.

10. The intermediate router according to claim 9, wherein the packet switched network is an Internet Protocol (IP) network, the first data packet is a lengthy low priority IP packet fragmented into Multilink Point to Point Protocol (PPP) (MP) Multi-Class Extension (MCE) fragments, the first data packet is identified by using the multi-class extension, and the header portion of the first data packet includes at least an IP header and a compressed PPP header.

11. The intermediate router according to claim 9, wherein a first received fragment of the first data packet includes a header portion of the first data packet, said header portion including a destination address of the receiving router, and wherein the means for forwarding each received fragment includes:
   means for associating the identifier of the first data packet with an output port number of the intermediate router in accordance with the destination address indicated in the header portion of the first received fragment; and
   means for transmitting all received fragments having the same identifier through the same output port in the order in which they were received.

* * * * *